(12) United States Patent
Xu et al.

(10) Patent No.: US 11,860,360 B2
(45) Date of Patent: Jan. 2, 2024

(54) DISPLAY APPARATUS, HEAD-UP DISPLAY AND MOTOR VEHICLE

(71) Applicant: FUTURUS TECHNOLOGY CO., LTD., Beijing (CN)

(72) Inventors: Junfeng Xu, Beijing (CN); Tao Fang, Beijing (CN); Huijun Wu, Beijing (CN)

(73) Assignee: FUTURUS TECHNOLOGY CO., LTD., Beijing (CN)

( * ) Notice: Subject to any disclaimer, the term of this patent is extended or adjusted under 35 U.S.C. 154(b) by 98 days.

(21) Appl. No.: 17/609,826

(22) PCT Filed: May 14, 2020

(86) PCT No.: PCT/CN2020/090203
§ 371 (c)(1),
(2) Date: Nov. 9, 2021

(87) PCT Pub. No.: WO2020/233492
PCT Pub. Date: Nov. 26, 2020

(65) Prior Publication Data
US 2022/0229293 A1    Jul. 21, 2022

(30) Foreign Application Priority Data

May 17, 2019   (CN) .......................... 201910414497.4
May 9, 2020   (CN) .......................... 202010389119.8

(51) Int. Cl.
*G02B 27/01*      (2006.01)
*G02B 27/18*      (2006.01)
(Continued)

(52) U.S. Cl.
CPC .......... *G02B 27/0101* (2013.01); *B60K 35/00* (2013.01); *G02B 27/0179* (2013.01);
(Continued)

(58) Field of Classification Search
CPC ...................... G02B 27/0101; G02B 27/0179; G02B 27/18; G02B 27/14; G02B 2027/0187;
(Continued)

(56) References Cited

U.S. PATENT DOCUMENTS

2003/0020880 A1   1/2003   Knoll et al.
2005/0094111 A1*   5/2005   May ....................... G03B 21/28
                                                                                                                                        353/98
(Continued)

FOREIGN PATENT DOCUMENTS

CN        105204283 A    12/2015
CN        106716248 A     5/2017
(Continued)

Primary Examiner — Brent D Castiaux
(74) Attorney, Agent, or Firm — Dilworth & Barrese, LLP.; Michael J. Musella, Esq.

(57) ABSTRACT

A display apparatus, a head-up display and a motor vehicle are provided. The display apparatus includes a projector device, a reflector structure and a light beam diffuser structure. Light emitted from the projector device passes through the light beam diffuser structure, is reflected by the reflector structure, and then reaches a first predetermined region; the light beam diffuser structure is configured to diffuse a light beam passing through the light beam diffuser structure; the reflector structure is configured to reflect the light emitted from the projector device and the light reflected by the plurality of sub-reflector structures reaches a second predetermined region within the first predetermined region if the light beam diffuser structure is removed from an optical path from the projector device to the first predetermined region, and an area of the second predetermined region is smaller than an area of the first predetermined region.

24 Claims, 7 Drawing Sheets

(51) Int. Cl.
*B60K 35/00* (2006.01)
*G03B 21/60* (2014.01)

(52) U.S. Cl.
CPC ............. *G02B 27/18* (2013.01); *G03B 21/60* (2013.01); *B60K 2370/1529* (2019.05); *B60K 2370/334* (2019.05); *G02B 2027/0187* (2013.01)

(58) Field of Classification Search
CPC ...... G02B 2027/0123; G02B 2027/011; B60K 35/00; B60K 2370/1529; B60K 2370/334; G03B 21/60; G03B 21/28; G03B 21/602
See application file for complete search history.

(56) References Cited

U.S. PATENT DOCUMENTS

2013/0120825 A1   5/2013   Lambert et al.
2013/0257689 A1*  10/2013  Hotta .................... G02B 5/02
                                                     345/8
2016/0116647 A1*  4/2016   Masson ................ G02B 5/3058
                                                     359/207.9
2018/0088255 A1*  3/2018   Sakai .................... B60K 35/00

FOREIGN PATENT DOCUMENTS

| | | |
|---|---|---|
| CN | 206523704 U | 9/2017 |
| CN | 207851415 U | 9/2018 |
| JP | 2001-108939 A | 4/2001 |
| JP | 2005-500567 A | 1/2005 |
| JP | 2008-292665 A | 12/2008 |
| JP | 2009-184406 A | 8/2009 |
| JP | 2010-254149 A | 11/2010 |
| JP | 2010-256867 A | 11/2010 |
| JP | 2011-197292 4 | 10/2011 |
| JP | 2012-252226 A | 12/2012 |
| JP | 2017-531212 A | 10/2017 |
| JP | 2018-146784 A | 9/2018 |
| WO | 2018168846 A1 | 9/2018 |

\* cited by examiner

DISPLAY APPARATUS, HEAD-UP DISPLAY AND MOTOR VEHICLE

The present application claims priority of the Chinese Patent Application No. 201910414497.4 filed on May 17, 2019, and priority of the Chinese Patent Application No. 202010389119.8 filed on May 9, 2020. For all the purposes, the entire disclosures of the above-mentioned Chinese Patent Applications are incorporated herein by reference in their entirety as part of the present application.

TECHNICAL FIELD

At least one embodiment of the present disclosure relates to a display apparatus, a head-up display and a motor vehicle.

BACKGROUND

Head-up display (HUD) technology can project image light (including vehicle information such as vehicle speed) emitted from an image source onto a displaying window, such as the windshield, etc., of the vehicle, so that the driver can directly observe the information without looking down at the dashboard during driving, which can not only improve the driving safety factor, but also bring a better driving experience.

SUMMARY

At least one embodiment of the present disclosure provides a display apparatus, a head-up display and a motor vehicle.

At least one embodiment of the present disclosure provides a display apparatus, which including a projector device, a reflector structure and a light beam diffuser structure. Light emitted from the projector device passes through the light beam diffuser structure, is reflected by the reflector structure, and then reaches a first predetermined region; the light beam diffuser structure is configured to diffuse a light beam passing through the light beam diffuser structure without changing chief light of the light beam; the reflector structure comprises a plurality of sub-reflector structures, the plurality of sub-reflector structures are configured to reflect the light emitted from the projector device and the light reflected by the plurality of sub-reflector structures reaches a second predetermined region within the first predetermined region on the assumption that the light beam diffuser structure is removed from an optical path from the projector device to the first predetermined region, and an area of the second predetermined region is smaller than an area of the first predetermined region.

For example, in embodiments of the present disclosure, the display apparatus further includes a transflective structure, configured to reflect the light passing through the reflective structure and exiting from the light beam diffuser structure, wherein the light reflected by the transflective structure reaches the first predetermined region.

For example, in embodiments of the present disclosure, the light beam diffuser structure and the reflector structure overlap each other, the light emitted from the projector device is incident on the reflector structure after passing through the light beam diffuser structure, and the light reflected by the reflector structure passes through the light beam diffuser structure again and then reaches the first predetermined region.

For example, in embodiments of the present disclosure, the transflective structure is configured to reflect light, which is directly incident on the transflective structure after passing through the reflector structure and the light beam diffuser structure, directly to the first predetermined region.

For example, in embodiments of the present disclosure, the projector device, the first predetermined region, the reflector structure and the light beam diffuser structure are located at a first side of the transflective structure, and the transflective structure is further configured to transmit ambient light from a second side of the transflective structure to the first predetermined region.

For example, in embodiments of the present disclosure, the reflector structure further includes a substrate, the plurality of sub-reflector structures are arranged at intervals on a side of the substrate, the side of the substrate faces the projector device, each of the plurality of sub-reflector structures comprises at least one reflective surface, and a plurality of reflective surfaces that the plurality of sub-reflector structures comprise are configured to reflect and converge the light emitted from the projector device.

For example, in embodiments of the present disclosure, each of the plurality of sub-reflector structures includes one planar reflective surface, the reflector structure includes a reference region, and included angles between planar reflective surfaces of the plurality of sub-reflector structures and the substrate are gradually increased along a direction from a position close to the reference to a position away from the reference region.

For example, in embodiments of the present disclosure, a maximum size of the planar reflective surface of each of the plurality of sub-reflector structures is larger than a distance between two adjacent sub-reflector structures.

For example, in embodiments of the present disclosure, the maximum size of each planar reflective surface ranges from 100 microns to 100 millimeters.

For example, in embodiments of the present disclosure, a shape of each of the plurality of sub-reflector structures includes a polyhedron, and one surface of the polyhedron is the planar reflective surface.

For example, in embodiments of the present disclosure, the planar reflective surface of each of the plurality of sub-reflector structures includes a preset point, a mirror point formed by an observation point in the first predetermined region relative to the transflective structure is a virtual image of the observation point, a mirror point formed by the preset point relative to the transflective structure is a virtual image of the preset point, and a center of a light emitting surface of the projector device is a light emitting point, a normal line of the planar reflective surface is located at an angular bisector of a first connecting line, between the preset point and the light emitting point, and a second connecting line, between the preset point and the virtual image of the observation point; or a connecting line between the observation point and the virtual image of the preset point intersects the transflective structure to have an intersection point with the transflective structure, and a normal line of the planar reflective surface is located at an angular bisector of a first connecting line, between the preset point and the light emitting point, and a third connecting line, between the preset point and the intersection point.

For example, in embodiments of the present disclosure, each of the plurality of sub-reflector structures includes a continuous curved reflective surface, and reflective surfaces of adjacent sub-reflector structures are not parallel to each other.

For example, in embodiments of the present disclosure, a cross section of each of the plurality of sub-reflector structures taken along an arrangement direction of the plurality of sub-reflector structures includes a polygon; and in the cross section of the each of the plurality of sub-reflector structures, a side where the reflective surface is located is a straight side.

For example, in embodiments of the present disclosure, each of the plurality of sub-reflector structures is a ring structure, the plurality of sub-reflector structures are arranged as a multi-ring structure, and a surface of each ring structure, the surface facing a center of the reflector structure, is the curved reflective surface.

For example, in embodiments of the present disclosure, included angles between a plurality of curved reflective surfaces of the plurality of sub-reflector structures and the substrate are gradually increased along a direction pointing from an inner ring of the multi-ring structure to an outer ring of the multi-ring structure.

For example, in embodiments of the present disclosure, maximum sizes of respective sub-reflector structures are equal along a direction perpendicular to the substrate; or, ring widths of orthographic projections of the plurality of sub-reflector structures on the substrate are equal.

For example, in embodiments of the present disclosure, the light beam diffuser structure includes at least one selected from the group consisting of a diffractive optical element and a scattering optical element.

For example, in embodiments of the present disclosure, the projector device includes a projection light source, an image generator portion and a lens portion, the image generator portion is configured to convert light emitted from the projection light source into image light, and the image light is emitted from the projector device after passing through the lens portion; the image generator portion comprises a plurality of pixels, and a maximum size of the reflective surface of each of the plurality of sub-reflector structures is less than or equal to a maximum size of each of the plurality of pixels.

For example, in embodiments of the present disclosure, each of the plurality of sub-reflector structures comprises at least two reflective surfaces, the projector device comprises two sub-projector devices, each of the plurality of sub-reflector structures is configured to reflect light emitted from the two sub-projector devices, the light emitted from the two sub-projector devices and reflected by each of the plurality of sub-reflector structures reaches a third predetermined region, and the third predetermined region comprises two first predetermined regions.

Another embodiment of the present disclosure provides a head-up display, including the display apparatus in any embodiment as mentioned above.

Another embodiment of the present disclosure provides a motor vehicle, including the head-up display as mentioned above.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
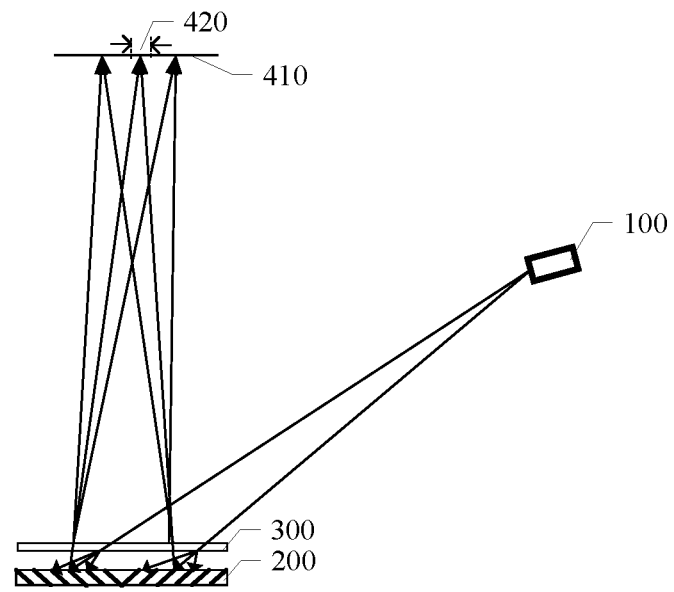
FIG. 1 is a schematic structural diagram of a display apparatus according to an example of an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects.

In research, the inventors of the present application have found that the field of view (FOV) of the head-up display, which realizes reflective imaging based on a free curved mirror, is very small, generally within 10 degrees, thus resulting in the small size of the image displayed by the head-up display. The above-mentioned head-up display can only display the speed or direction information, but cannot display more abundant information, such as navigation map and complex safety information, so it is difficult to meet the needs of drivers to master all kinds of information during vehicle travel.

Generally, it is necessary to increase the area of the display region in the image source and increase the power consumption of the image source, so as to realize displaying with high-definition and highlight of a large-size head-up display. If the field of view and display region of the head-up display, which realizes reflective displaying based on a free curved mirror, are enlarged by an optical design method, the phenomena of insufficient brightness, unstable image and distorted picture, etc., easily occurs, and in order to ensure the brightness of the picture, it will cause extremely high power consumption.

The embodiments of the present disclosure provide a display apparatus, a head-up display, and a motor vehicle. The display apparatus includes a projector device, a reflector structure and a light beam diffuser structure. Light emitted from the projector device passes through the light beam diffuser structure and is reflected by the reflector structure, and then reaches a first predetermined region; the light beam diffuser structure is configured to diffuse a light beam passing through the light beam diffuser structure without changing chief light (light axis, or optical axis) of the light beam; the reflector structure includes a plurality of sub-reflector structures, the plurality of sub-reflector structures are configured to reflect the light emitted from the projector device to a second predetermined region within the first predetermined region in a case where the light beam diffuser structure is removed from an optical path from the projector device to the first predetermined region, and an area of the second predetermined region is smaller than an area of the first predetermined region. The display apparatus provided by the embodiments of the present disclosure, by arrangement of the reflector structure and the light beam diffuser structure, makes the light beam emitted from the projector device cover the driver's eye located in the first predetermined region (i.e., a planar observation region), so that the utilization ratio of the light beam can be improved to reduce the power consumption, and the field of view of the display apparatus can also be increased, thereby realizing the displaying effect with a large field of view and low power consumption. The display apparatus provided by the embodiments of the present disclosure can concentrate the light beams emitted from the projector device in the first predetermined region as much as possible, and improve the utilization ratio of light beams under the condition of expanding the field of view of the display apparatus.

The display apparatus, the head-up display and the motor vehicle provided by the embodiments of the present disclosure will be described below with reference to the accompanying drawings.

Figure 5:
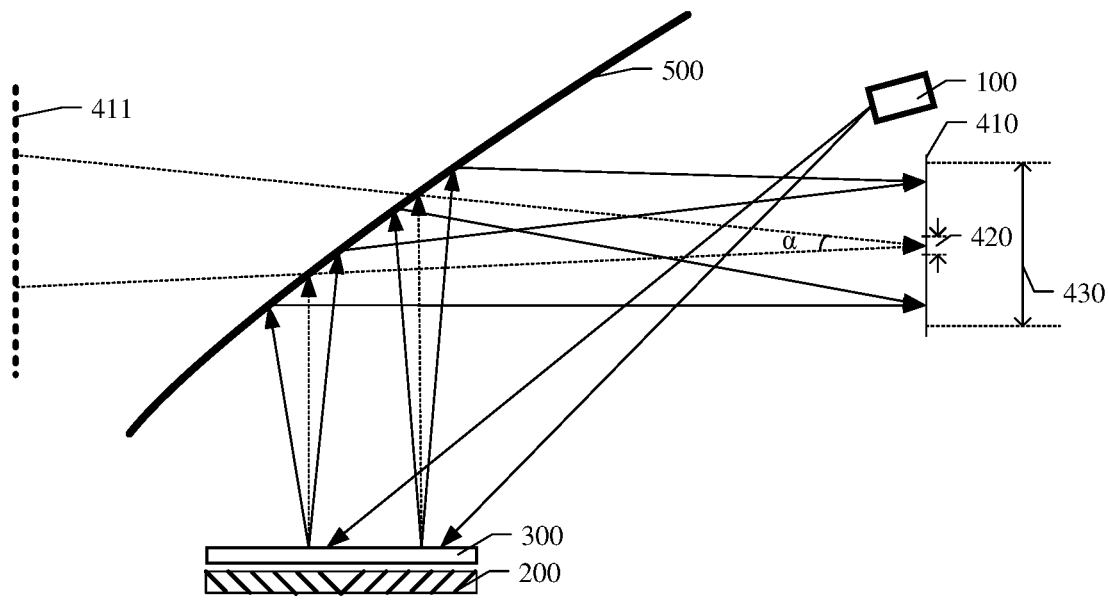
FIG. 5 is a schematic structural diagram of a display apparatus according to another example of the embodiment of the present disclosure.

FIG. 1 is a schematic structural diagram of a display apparatus according to examples of embodiments of the present disclosure. As shown in FIG. 1, the display apparatus includes a projector device 100, a reflector structure 200 and a light beam diffuser structure 300. The reflector structure 200 is configured to reflect light emitted from the projector device 100, and the light beam diffuser structure 300 is configured to diffuse a light beam passing through the light beam diffuser structure 300 without changing the chief light of the light beam. The light emitted from the projector device 100 passes through the light beam diffuser structure 300 and is reflected by the reflector structure 200, and then reaches a first predetermined region 410. The above-mentioned "chief light" refers to the center line of the light beam. For example, that "the light emitted from the projector device 100 passes through the light beam diffuser structure 300 and is reflected by the reflector structure 200, and then reaches a first predetermined region 410" can refer to that the light passing through the light beam diffuser structure 300 and the reflector structure 200 can directly reach the first predetermined region 410 (as shown in FIG. 1), or may reach the first predetermined region 410 after being acted by other optical elements (as shown in FIG. 5).

The above-mentioned "first predetermined region" refers to a planar observation region. The light emitted from the projector device passes through the light beam diffuser structure and is reflected by the reflector structure, and then reaches the plane where the first predetermined region is located, most of the light is concentrated in the first predetermined region (for example, more than 90%, in terms of light intensity, of the light incident on the plane where the first predetermined region is located is concentrated in the first predetermined region, or more than 80%, in terms of light intensity, of the light incident on the plane where the first predetermined region is located is concentrated in the first predetermined region, or more than 60%, in terms of light intensity, of the light beams incident on the plane where the first predetermined region is located are concentrated in the first predetermined region), and the light incident on the first predetermined region is spread over the first predetermined region.

As shown in FIG. 1, the light beam diffuser structure 300 and the reflector structure 200 are stacked, and the light emitted from the projector device 100 passes through the light beam diffuser structure 300 and then is incident on the reflector structure 200, and the light reflected by the reflector structure 200 passes through the light beam diffuser structure 300 again and then reaches the first predetermined region 410. That is, the light emitted from the projector device 100 passes through the light beam diffuser structure 300 twice before reaching the first predetermined region 410, and is diffused in both processes of passing through the light beam diffuser structure 300, and the combined action of the two times of diffusion determines the range of the first predetermined region 410. After the light emitted from the projector device passes through the light beam diffuser structure, the light emitted from the projector device can be diffused in a relatively large range, so that the field of view of the display apparatus can be increased without increasing the power consumption as much as possible.

For convenience, FIG. 1 only shows that the reflector structure 200 reflects part of the light to the light beam diffuser structure 300. For example, other diffused light incident on the reflector structure 200 should also be reflected by the reflector structure 200 to the light beam diffusing structure 300, and reach the first predetermined region 410 after second diffusion by the light beam diffuser structure 300. For example, in the case where the distance between the light beam diffuser structure 300 and the reflector structure 200 is small, the effect of the first diffusion of the light beam diffuser structure 300 is small, and the range of the first predetermined region 410 can be mainly determined by the effect of the second diffusion of the light beam diffuser structure 300.

Figure 2:
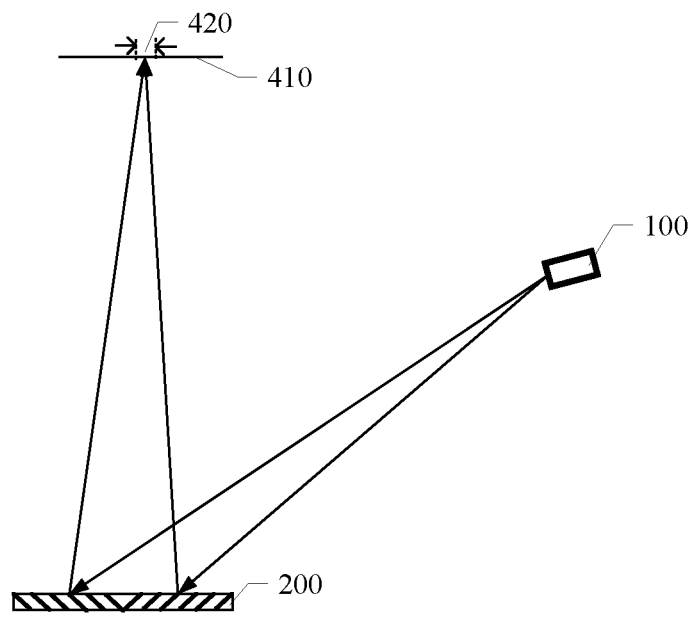
FIG. 2 is an optical path diagram of the display apparatus shown in FIG. 1 after removing a light beam diffuser structure.
Figure 3:
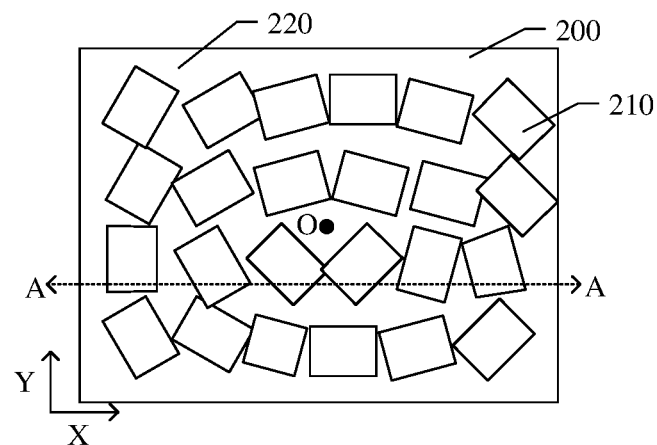
FIG. 3 is a partial planar structural view of a reflector structure in the display apparatus shown in FIG. 1 and FIG. 2.
Figure 4:
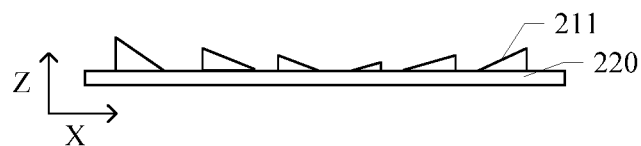
FIG. 4 is a partial cross-sectional structural view of the reflector structure shown in FIG. 3 taken along line AA.

FIG. 2 is an optical path diagram of the display apparatus shown in FIG. 1 after removing the light beam diffuser structure; FIG. 3 is a partial planar structural view of the reflector structure in the display apparatus shown in FIG. 1 and FIG. 2; and FIG. 4 is a partial cross-sectional structural view of the reflector structure shown in FIG. 3 taken along line AA. As shown in FIG. 1 to FIG. 4, the reflector structure 200 includes a plurality of sub-reflector structures 210, the plurality of sub-reflector structures 210 are configured to reflect the light emitted from the projector device 100 to a second predetermined region 420 within the first predetermined region 410 in the case where the light beam diffuser structure 300 is removed from the optical path from the projector device 100 to the first predetermined region 410, and the area of the second predetermined region 420 is smaller than the area of the first predetermined region 410. That is, in the case where the light emitted from the projector device 100 is directly reflected by the reflector structure 200 without passing through the light beam diffuser structure 300 and the light reflected by the reflector structure 200 reaches the first predetermined region 410 without passing through the light beam diffuser structure 300, the light incident on the first predetermined region is basically concentrated in the second predetermined region 420 located in the first predetermined region 410. For example, the light emitted from the projector device does not pass through the light beam diffuser structure, but is directly reflected by the reflector structure, and then reaches the plane where the second predetermined region is located, most of the light other than stray light is concentrated in the second predetermined region in the plane, and the light concentrated in the second predetermined region is distributed all over the second predetermined region. The optical axes of the light beams reflected by the reflector structure are all concentrated in the second predetermined region, and light (such as stray light) at other angles may not be concentrated in the second predetermined region.

For example, the second predetermined region 420 can be a region with a very small area. For example, the second predetermined region 420 may be a point. For example, the ratio of the area of the first predetermined region 410 to the area of the second predetermined region 420 can be larger than 4. For example, the ratio of the area of the first predetermined region 410 to the area of the second predetermined region 420 can be in the range of 5 to 100. For example, the ratio of the area of the first predetermined region 410 to the area of the second predetermined region 420 can be in the range of 20 to 200. The larger the ratio of the area of the first predetermined region 410 to the area of the second predetermined region 420, the more it can ensure the brightness of the picture while reducing the power consumption. Therefore, in the case where only the projector device and the reflector structure are provided in the display apparatus, the light emitted from the projector device can be accurately reflected to the second predetermined region. By arranging the light beam diffuser structure in the optical path through which the light emitted from the projector device reaches the second predetermined region, the second predetermined region can be expanded into the first predetermined region. For example, in the case where the light beam diffuser structure has an accurate and controllable beam expansion function, the first predetermined region is a region obtained by accurate and controllable diffusion light based on the second predetermined region, thereby preventing the light beam from projecting to a position where projection is unnecessary, and saving power consumption while increasing the field of view.

For example, the display apparatus provided by the embodiments of the present disclosure can be a head-up display. By setting the reflector structure and the light beam diffuser structure, the light beam emitted from the projector device covers the eye, located in the first predetermined region, of the driver, so that the utilization ratio of the light beam is improved to reduce the power consumption, and the field of view of the head-up display is also increased, thereby realizing the imaging effect with a large field of view and low power consumption. That is to say, the head-up display provided by the embodiments of the present disclosure can concentrate the light beams emitted from the projector device in the first predetermined region as much as possible, and improve the utilization ratio of light beams under the condition of expanding the field of view of the head-up display.

For example, FIG. 1 and FIG. 2 merely illustratively show that light passing through the light beam diffuser structure 300 and the reflector structure 200 can directly reach the first predetermined region 410, but is not limited thereto; for example, the light passing through the light beam diffuser structure 300 and the reflector structure 200 can also reach the first predetermined region 410 after being acted by other optical elements. For example, FIG. 5 is a schematic structural diagram of a display apparatus according to another example of the embodiment of the present disclosure. As shown in FIG. 5, the display apparatus further includes a transflective structure 500, the transflective structure 500 is configured to reflect light exiting from the reflector structure 200 and the light beam diffuser structure 300 to the first predetermined region 410. That is, the transflective structure 500 is provided in the optical path through which the light exiting from the reflector structure 200 and the light beam diffusing structure 300 reaches the first predetermined region 410. For example, the transflective structure 500 as mentioned above is a semi-transparent and semi-reflector structure, which can reflect the light exiting from the reflector structure 200 and the light beam diffuser structure 300, but basically has no effect of converging or diffusing the light beams.

For example, as shown in FIG. 5, the transflective structure 500 is configured to reflect light, which is directly incident on the transflective structure 500 after passing through the reflector structure 200 and the light beam diffuser structure 300, directly to the first predetermined region 410. That is, the light exiting from the reflector structure 200 and the light beam diffuser structure 300 is directly incident on the first predetermined region 410 only after being reflected by the transflective structure 500. It should be noted that, for the convenience of displaying the optical path, FIG. 5 illustratively only shows the light beams passing through the reflector structure and the light beam diffuser structure which is exited from the surface of the light beam diffuser structure facing the projector device, while the light beams expanded by the light beam diffuser structure and incident onto the reflector structure and the light beams reflected by the reflector structure and incident onto the light beam diffuser structure are not shown. FIG. 5 illustratively regards the reflector structure and the light beam diffuser structure as a whole to reflect the light emitted from the projector device. There is a certain distance between the incident point, of the light emitted from the projector device, on the light beam diffuser structure and the exit point, of the light exiting from the light beam diffuser structure to the transflective structure, on the light beam diffuser structure, and the distance can be designed to be small.

Of course, the embodiments of the present disclosure are not limited to this case, and any other optical element beneficial to imaging can also be inserted between the light beam diffuser structure 300 and the transflective structure 500 or between the transflective structure 500 and the first predetermined region 410.

For example, the eye of an observer (e.g., a driver or a passenger) can be located in the first predetermined region 410, so as to see the virtual image 411 located at one side of the transflective structure 500 away from the first predetermined region 410. For example, a region where the observer needs to watch imaging, i.e., an eyebox region 430, can be preset according to actual needs, and the eyebox region 430 refers to a planar region where both eyes of the observer are located and the image displayed by the display apparatus can be seen. For example, the first predetermined region 410 can include the eyebox region 430. For example, in the case where the eye of the observer deviate from the center of the eyebox region 430 by a certain distance, e.g., moving up or down or left or right for a certain distance, the observer can still see the image displayed by the display apparatus as long as the eye of the observer are still in the eyebox region 430.

For example, as shown in FIG. 5, the first predetermined region 410 can be located at one side of the projector device 100 close to the reflector structure 200, that is, the projector device 100 and the reflector structure 200 are approximately located at both sides of the first predetermined region 410. For example, the projector device 100, the first predetermined region 410, the reflector structure 200 and the light beam diffuser structure 300 are located at a first side of the transflective structure 500, and the transflective structure 500 is further configured to transmit ambient light from a second side of the transflective structure 500 to the first predetermined region 410. Therefore, the external environment (e.g., the external environment during driving) and the image displayed by the display apparatus (e.g., the image of navigation map, complex safety information, etc.) can be simultaneously seen at the first predetermined region 410, thus providing the observer a better experience while ensuring the safety of the observer (e.g., the driver).

For example, the transflective structure 500 can be a windshield or a displaying window, corresponding to a windshield head-up display (W-HUD) and a combiner head-up display (C-HUD), respectively. For example, the transflective structure 500 can also be provided with a reflective film, and the reflective film can efficiently reflect projection light and efficiently transmit external ambient light.

For example, as shown in FIG. 1, FIG. 2 and FIG. 5, in the case where the light beam diffuser structure 300 is removed from the optical path between the projector device 100 and the first predetermined region 410, the plurality of sub-reflector structures will reflect the light emitted from the projector device 100 to the transflective structure 500, and then the transflective structure 500 will reflect the light to an observation point with a relatively small area in the first predetermined region 410 (i.e., the second predetermined region). After the light beam diffuser structure 300 is arranged in the optical path through which the light emitted from the projector device 100 is projected to the observation point, the light beam exited from the light beam diffuser structure 300 to the transflective structure 500 will diffuse into a light beam with a certain divergence angle. Therefore, the light reflected by the transflective structure 500 will spread from the observation point to the whole first predetermined region 410, so that the observer can observe the image. It should be noted that when taking different positions in the eyebox region as observation points, for example, taking the center of the eyebox or the edge of the eyebox as the observation point, the positions of the observed virtual images are also different, but the difference therebetween is small and can be ignored. It can be considered that when observing image in the eyebox region, the position of the virtual image is basically fixed, and the position where the light beam is reflected on the transflective structure is also basically fixed.

Compared with the display apparatus which realizes reflective imaging based on a free curved mirror, the head-up display provided by the embodiments of the present disclosure adopts the combination of the projector device, the reflector structure and the light beam diffuser structure, and can make the light beam emitted from the projector device cover the position of the driver's eye after being reflected, and the light beam is efficiently utilized. Moreover, the horizontal field of view with respect to position of the driver's eye when observing an image ranges from 20 degrees to 50 degrees, and the vertical field of view a ranges from 5 degrees to 20 degrees, which can solve the problem of limited field of view of the head-up display and realize imaging with an ultra-large field of view and low power consumption. The above-mentioned "horizontal" and "vertical" refer to two directions perpendicular to each other. Taking the coordinate system of the vehicle as an example, the above-mentioned "horizontal" can refer to the width direction of the vehicle in the coordinate system of the vehicle, and the above-mentioned "vertical" can refer to the height direction of the vehicle in the coordinate system of the vehicle.

For example, as shown in FIG. 1 to FIG. 4, the reflector structure 200 further includes a substrate 220, the plurality of sub-reflector structures 210 are arranged at intervals on one side of the substrate 220 facing the projector device 100, each sub-reflector structure 210 includes at least one reflective surface 211 facing the projector device 100, and the plurality of reflective surfaces 211 included in the plurality of sub-reflector structures 210 are configured to reflect and converge the light emitted from the projector device 100. The above-mentioned "the plurality of reflective surfaces 211 are configured to reflect and converge the light emitted from the projector device 100" means that there are no any other optical elements between the projector device and the reflective surfaces, and, for example, the plurality of reflective surfaces are converge the light directly projected from the projector device to the reflective surfaces, or a light beam diffuser structure is arranged between the reflective surfaces and the projector device, and, for example, the plurality of reflective surfaces are converge the light emitted from the projector device and then transmitted through the light beam diffuser structure.

For example, the substrate 220 can be a planar substrate, and by designing the included angle between the reflective surface 211 of each sub-reflector structure 210 and the substrate 220, the plurality of sub-reflector structures 210 arranged on the planar substrate can ensure that the light emitted from the projector device 100 reaches the first predetermined region 410 after being reflected by the reflector structure.

For example, the substrate 220 and the plurality of sub-reflector structures 210 can be integrated, and each sub-reflector structure 210 can be formed by machining on the surface of the substrate 220.

For example, as shown in FIG. 1 to FIG. 4, the reflector structure 200 includes a reference point O, and each sub-reflector structure 210 includes a planar reflective surface 211; along a direction away from the reference point O, the included angles between the planar reflective surfaces 211 of the plurality of sub-reflector structures 210 and the substrate 220 are gradually increased, so that the light emitted from the projector device 100 can be reflected by the plurality of sub-reflector structures 210 to reach the first predetermined region 410. For example, the above-mentioned "reference point O" is located at any position on the reflector structure, and for example, in the case where the reference point deviates from the geometric center of the reflector structure, the plurality of reflective surfaces arranged based on the reference point realize eccentric convergence; and for example, the reference point can also be located at the geometric center of the reflector structure.

For example, a region with a small area around the reference point can form a reference region, or the area of the reference region is extremely small, so that the reference region is approximately a point, i.e., the reference point. For example, the included angles between the planar reflective surfaces of the sub-reflector structures located in the reference region and the substrate can be equal, while the included angles between the reflective surfaces of the sub-reflector structures located at the outer side of the reference region can be gradually increased along the direction from close to the reference region to away from the reference region.

For example, as shown in FIG. 3 and FIG. 4, the shape of each sub-reflector structure 210 includes a polyhedron, and one surface of the polyhedron is the planar reflective surface 211. For example, the polyhedron can be a prism.

For example, the reflective surface 211 of each sub-reflector structure 210 faces the reference point of the reflector structure 200.

Figure 6:
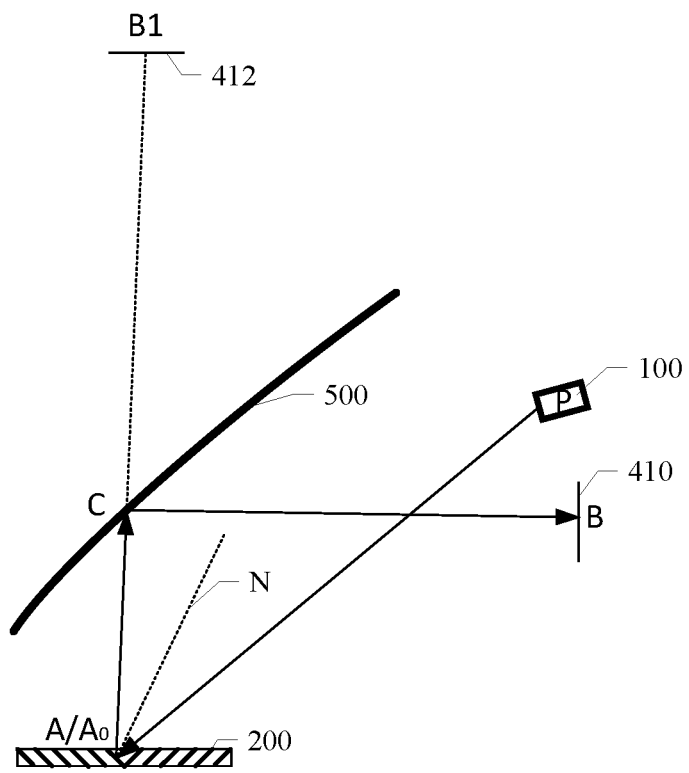
FIG. 6 is an optical path diagram of determining a normal line direction of each sub-reflector structure.

For example, FIG. 6 is an optical path diagram of determining a normal line direction of each sub-reflector structure. As shown in FIG. 6, the head-up display provided by the embodiments of the present disclosure is applied to a motor vehicle as an example. In the vehicle coordinate system, the starting position of the light beam emitted from the projector device 100 is a point P (e.g., a point on the light emitting surface of the projector device), and the location of the point P in the vehicle coordinate system is known. The first predetermined region 410 includes a point B at the center position of the eyebox region (e.g., the central point of the eyebox region, e.g., the central point of the first predetermined region), and the location of the point B in the vehicle coordinate system is also known. Taking the point B as the observation point and according to the reflection law, it can be considered that after the light beam emitted from the projector device 100 is reflected by the reflector structure 200, the reflected light beam reaches the virtual image position (point B1) of the observation point B in the first predetermined region. In this case, the point B1 can be regarded as a virtual image of the observation point which is a mirror point formed by the observation point in the first predetermined region 410 relative to the transflective structure, and the position where the point B1 is located is the virtual image region 412 of the first predetermined region. The location of the virtual image position B1 corresponding to the point B relative to the transflective structure 500 is also fixed and known. For example, the reflector structure 200 can be arranged on the surface of the instrument panel (IP) of the vehicle, so the location of the reflector structure 200 is also known, and the location of a preset point A (e.g., central point) on the reflector structure 200 is also known.

For example, after determining the four known locations of the point P, the point A, the point B and the point B1, the location of the intersection point C between the connecting line from the point B1 to the point A and the transflective structure 500 can be determined. For example, the vector AC is determined according to the spatial coordinates of the point A and point C, the vector AP is determined according to the spatial coordinates of the point A and point P, and the normal vector of the planar reflective surface of each sub-reflector structure can be determined according to the vector AC and the vector AP. That is, the reflective surface of each sub-reflector structure is determined by the location of the first predetermined region (the point B), the location of the projector device (the point P) and the location of the sub-reflector structure itself (the point A). For example, in terms of each sub-reflector structure, a known point (point $A_0$) on each sub-reflector structure can be determined, and then the normal vector of each sub-reflector structure can be determined by combining the location of the first predetermined region (the point B) and the location of the projector device (the point P), so as to determine the reflective surface of each sub-reflector structure, thus determining the distribution of the plurality of sub-reflector structures.

For example, as shown in FIG. 3, FIG. 4 and FIG. 6, the maximum size of the reflective surface 211 of each sub-reflector structure 210 ranges from 100 microns to 100 millimeters. For example, the maximum size of the orthographic projection of each sub-reflector structure 210 on the substrate 220 ranges from 100 microns to 100 millimeters. For example, the maximum size of the reflective surface 211 of each sub-reflector structure 210 ranges from 100 microns to 500 microns. For example, the maximum size of the reflective surface 211 of each sub-reflector structure 210 ranges from 100 microns to 300 microns. If the size of each sub-reflector structure is too small, the light beam will diffract on the sub-reflector structure, which will affect the reflection effect. In the case where the light beam incident on the sub-reflector structure does not diffract, the smaller the size of the reflective surface of the sub-reflector structure, the better the reflection effect will be.

For example, taking the point $A_0$ on one sub-reflector structure of the reflector structure 200 onto which the light emitted from the projector device is incident as an example, a coordinate of $A_0$ is $(x_0, y_0, z_0)$, and the normal line N of the reflective surface of the sub-reflector structure is a vertical vector perpendicular to the reflective surface. In the spatial coordinate system, the vertical vector satisfies $\vec{P_\perp}=(P_{\perp x}, P_{\perp y}, P_{\perp z})$. The above-mentioned $P_{\perp x}$, $P_{\perp y}$ and $P_{\perp z}$ are the components of the normal vector $\vec{P\perp}$ on the x axis, the y axis and the z axis. According to the reflection law, the incident angle between the incident light beam $PA_0$ and the normal line N of the reflective surface of the sub-reflector structure is equal to the emergent angle between the reflected light beam $A_0C$ and the normal line N, then the normal vector of the reflective surface is located on the angular bisector of the vector $\vec{A_0P}$ and the vector $\vec{A_0B_1}$. Thus, the normal vector $\vec{P_\perp}$ satisfies the following relationship expression (1):

$$\vec{P_\perp} = \frac{\vec{A_0P}}{|A_0P|} + \frac{\vec{A_0B_1}}{|A_0B_1|}.$$

For any point M (x, y, z) on the reflective surface, the vector $\overrightarrow{MA_0}$ is perpendicular to the vector $\overrightarrow{P_\perp}$, then $\overrightarrow{MA_0}$ and $\overrightarrow{P_\perp}$ satisfy $\overrightarrow{MA_0} * \overrightarrow{P_\perp} = 0$. That is, $\overrightarrow{MA_0}$ and $\overrightarrow{P_\perp}$ satisfy the following relationship expression (2):

$$P_{\perp,x}*(x-x_0)+P_{\perp,y}*(y-y_0)+P_{\perp,z}*(z-z_0)=0.$$

For example, for each sub-reflector structure, a known point $A_0$ on each sub-reflector structure is determined. By combining the known point $A_0$ and the position P of the projector device 100 as well as the position B1 of the virtual image 412 of the first predetermined region, the normal vector of each sub-reflector structure can be determined, and then the reflective surface of each sub-reflector structure can be determined. For example, the known point $A_0$ can be any point on the sub-reflector structure, such as the point on the intersection line between the sub-reflector structure and the substrate, or the central point of the sub-reflector structure, etc.

For example, the substrate 220 can be divided into m*n regions, and each region is provided with one sub-reflector structure. For example, in order to facilitate determining the value range of the point M on the reflective surface of the sub-reflector structure, the point M can be projected onto a region on the substrate, and the boundary of the region on the substrate is taken as the value range of the point M. For example, the spatial coordinates of one point on each small region, e.g., the central point, can be determined, and this point can be taken as the known point $A_0$. The area of the small regions can be the same or different. The coordinates x, y, z of the any point M (x, y, z) in the above relationship expression (2) have a certain value range, which can satisfy the following relationship expressions (3):

$$\begin{cases} x_0 - \Delta x_1 \leq x \leq x_0 + \Delta x_2 \\ y_0 - \Delta y_1 \leq y \leq y_0 + \Delta y_2 \\ z_0 - \Delta z_1 \leq z \leq z_0 + \Delta z_2 \end{cases}$$

The aforementioned $\Delta x_1$, $\Delta x_2$, $\Delta y_1$, $\Delta y_2$, $\Delta z_1$, $\Delta z_2$ are preset values determined based on the size of the sub-reflector structure (e.g., the size of the reflective surface or the size of the region on the substrate where the sub-reflector structure is located), and different sub-reflector structures can adopt $\Delta x_1$, $\Delta x_2$, $\Delta y_1$, $\Delta y_2$, $\Delta z_1$, $\Delta z_2$ with the same values, or select different values based on actual conditions. For example, assuming $\Delta x_1 = \Delta x_2 = 0.5$, after determining the location of $A_0(x_0, y_0, z_0)$, if $x_0 = 3$, the value range of x component of the M point on the reflective surface of the sub-reflector structure is [2.5, 3.5]. If $A_0$ is not the central point, assuming $\Delta x_1 = 0.4$, $\Delta x_2 = 0.6$, and $x_0 = 3$, the value range of x component of the M point on the reflective surface of the sub-reflector structure is [2.4, 3.6]. The smaller the size of the reflective substructure is, the smaller the values of the corresponding $\Delta x_1$, $\Delta x_2$, $\Delta y_1$, $\Delta y_2$, $\Delta z_1$, $\Delta z_2$ are.

Figure 7:
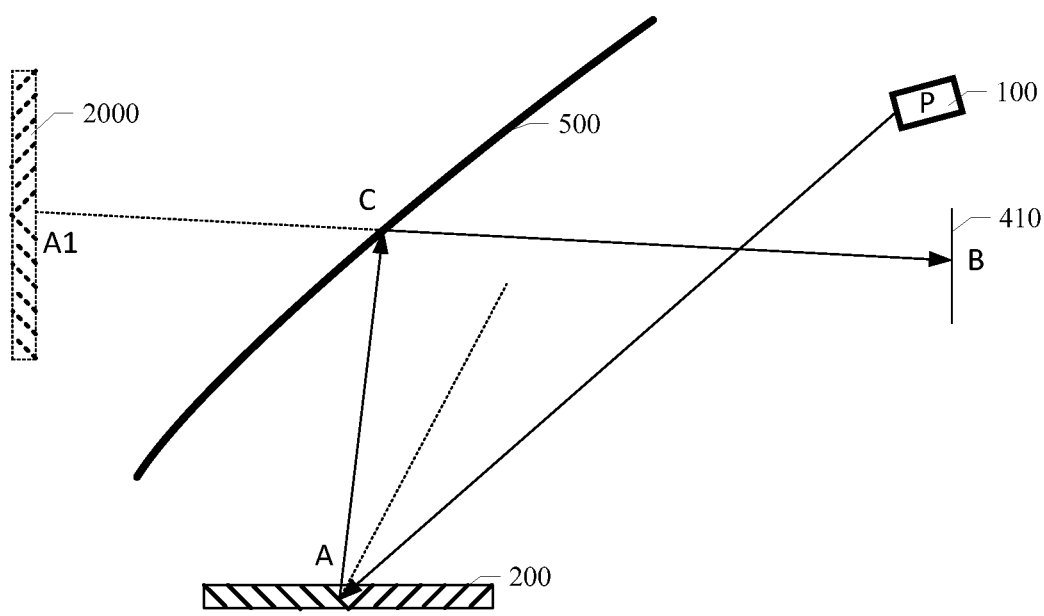
FIG. 7 is another optical path diagram of determining a normal line direction of each sub-reflector structure.

For example, FIG. 7 is another optical path diagram of determining a normal line direction of each sub-reflector structure. As shown in FIG. 7, the head-up display provided by the embodiments of the present disclosure is applied to a motor vehicle as an example. In the vehicle coordinate system, the starting position of the light beam emitted from the projector device 100 is a point P (e.g., a point on the light emitting surface of the projector device), and the location of the point P in the vehicle coordinate system is known. The first predetermined region 410 includes a point B at the center position of the eyebox region (e.g., the central point of the eyebox region, e.g., the central point of the first predetermined region), and the location of the point B in the vehicle coordinate system is also known. Taking the point B as the observation point in the first predetermined region, the location of the virtual image 2000 of the reflector structure 200 relative to the transflective structure 500 is fixed. For example, the reflector structure 200 can be arranged on the surface of the instrument panel (IP) of the vehicle, so the location of the reflector structure 200 is also known, and the location of one point A (e.g., central point) on the reflector structure 200 is also known, and the location of the mirror point formed by the preset point A on the reflector structure 200 relative to the transflective structure (i.e., the virtual image A1 of the preset point) is also known.

For example, after determining the four known locations of the point P, the point A, the point A1 and the point B, the location of the intersection point C between the connecting line from the point B to the point A1 and the transflective structure 500 can be determined. The vector AC can be determined according to the spatial coordinates of the point A and point C, the vector AP can be determined according to the spatial coordinates of the point A and point P, and the normal vector of the planar reflective surface of each sub-reflector structure can be determined according to the vector AC and the vector AP. That is, the reflective surface of each sub-reflector structure is determined by the location of the first predetermined region (the point B), the location of the projector device (the point P) and the location of the sub-reflector structure itself (the point A). The method of determining the normal vector of each sub-reflector structure is the same as that described in the example shown in FIG. 6, and will not be repeated here.

For example, as shown in FIG. 3 and FIG. 4, the maximum size of the reflective surface 211 of each sub-reflector structure 210 is larger than the distance between two adjacent sub-reflector structures 210. For example, the plurality of sub-reflector structures 210 can be closely arranged to achieve a better reflection effect. FIG. 3 merely illustratively shows the arrangement manner of the plurality of sub-reflector structures 210. In fact, the distance between adjacent sub-reflector structures is very small, for example, 1/100-1/1000 of the maximum size of the reflective surface.

For example, the shapes of the reflective surfaces of the sub-reflector structures 210 can be the same or different. For example, the plurality of sub-reflector structures 210 are uniformly distributed, thus facilitating the arrangement design of the sub-reflector structures.

Figure 8:
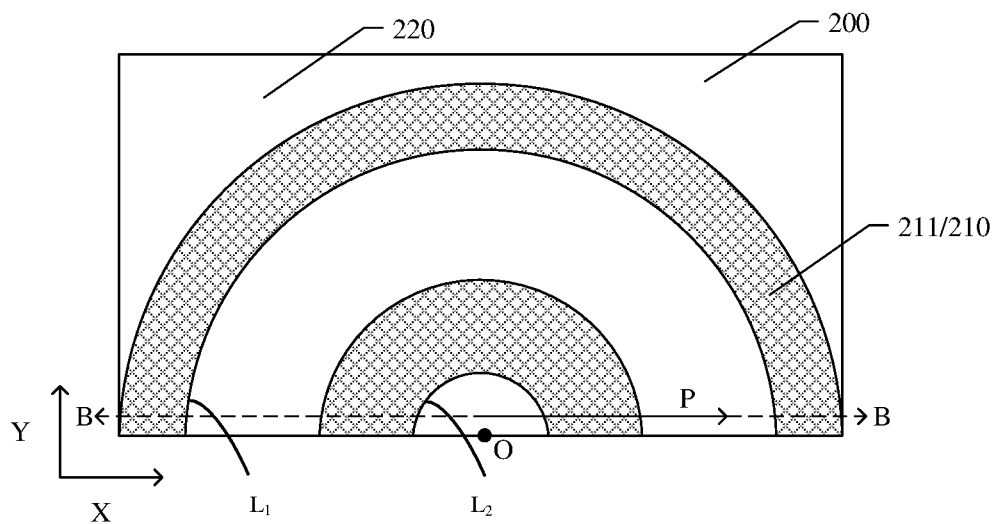
FIG. 8 is a partial planar structural view of another reflector structure in the display apparatus shown in FIG. 1 and FIG. 2.
Figure 9:
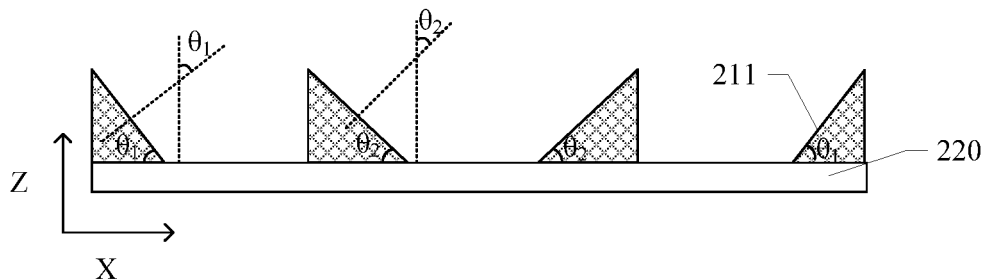
FIG. 9 is a partial cross-sectional structural view of the reflector structure shown in FIG. 8 taken along line BB.

FIG. 8 is a partial planar structural view of another reflector structure in the display apparatus shown in FIG. 1 and FIG. 2, and FIG. 9 is a partial cross-sectional structural view of the reflector structure shown in FIG. 8 taken along line BB. As shown in FIGS. 1-2 and FIGS. 8-9, each sub-reflector structure 210 includes a continuous curved reflective surface 211, and the reflective surfaces 211 in adjacent sub-reflector structures 210 are not parallel to each other. For example, the cross section of each sub-reflector structure 210 taken along the arrangement direction P of the plurality of sub-reflector structures 210 includes a polygon, and in the polygon, the side where the reflective surface 211 in the sub-reflector structure 210 is located is a straight side.

For example, as shown in FIG. 8 and FIG. 9, the cross-sectional shape of the reflective surface 211 of each sub-reflector structure 210, which is cut by a plane perpendicular to the substrate 220, is a straight line segment, and the included angle between the straight line segment and the substrate 220 is θ, that is, the included angle between the normal line of the reflective surface 211 and the normal line of the substrate 220 is θ.

For example, the substrate 220 is a planar substrate, and for example, the substrate 220 is parallel to the surface of the instrument panel (IP) of the vehicle. For example, the substrate 220 and the sub-reflector structure 210 can be integrated. FIG. 8 and FIG. 9 illustratively show two adjacent sub-reflector structures. The included angle between the reflective surface 211 of one sub-reflector structure 210 and the substrate 220 is $θ_1$, the included angle between the reflective surface 211 of the other sub-reflector structure 210 and the substrate 220 is $θ_2$, and $θ_1$ is not equal to $θ_2$. FIG. 8 illustratively shows that the arrangement direction P of the sub-reflector structures coincides with line BB. Of course, the arrangement direction of the sub-reflector structures in the embodiments of the present disclosure is not limited to the P direction shown in FIG. 8, but can also be along the y direction shown in FIG. 8.

For example, as shown in FIG. 8 and FIG. 9, each sub-reflector structure 210 is a ring structure, and the plurality of sub-reflector structures 210 are arranged as a multi-ring structure. The surface of each ring structure facing the center of the reflector structure 200 is a curved reflective surface 211, and the curved reflective surfaces are configured to converge and reflect the light emitted from the projector device to the first predetermined region. The above-mentioned ring structure can include a round ring structure or a non-standard round ring structure, such as a square ring structure, an elliptical ring structure, etc.

For example, as shown in FIG. 8 and FIG. 9, the orthographic projection of each sub-reflector structure 210 on the substrate 220 includes a ring shape, and the ring shape can be a closed ring shape or an open ring shape. For example, the arrangement direction of the plurality of sub-reflector structures 210 can be a direction pointing from the center of the inner ring to the edge, e.g., the P direction. For example, the plurality of sub-reflector structures 210 are include N sub-reflector structures 210, and the M-th sub-reflector structure 210 surrounds the (M−1)-th sub-reflector structure 210, and 1<M≤N. For example, that "the M-th sub-reflector structure 210 surrounds the (M−1)-th sub-reflector structure 210" is mean that the M-th sub-reflector structure 210 surrounds the (M−1)-th sub-reflector structure 210 completely, or that the M-th sub-reflector structure 210 surrounds the (M−1)-th sub-reflector structure 210 partially.

For example, the substrate 220 can be a planar substrate, and by designing the included angle between the reflective surface 211 of each sub-reflector structure 210 and the substrate 220, the plurality of sub-reflector structures 210 arranged on the planar substrate can ensure that the light emitted from the projector device 100 is reflected to the first predetermined region 410. For example, as shown in FIG. 8, the plurality of sub-reflector structures 210 in the embodiment of the present disclosure can be arranged as a multi-ring structure, and the included angles θ between the sub-reflector structures 210 and the substrate 220 are gradually increased along a direction pointing from the inner ring of the multi-ring structure to the outer ring of the multi-ring structure, so that the light emitted from the projector device can be reflected to the first predetermined region. As shown in FIG. 8, the reflector structure includes a reference point O, and the included angles θ between the sub-reflector structures 210 and the substrate 220 are gradually increased in a direction away from the reference point. For example, a small region where the reference point is located is a reference region, and the reference region can be a region where the center of the inner ring is located, so the direction pointing from the inner ring to the outer ring is also the direction pointing from close to the reference region to away from the reference region.

For example, as shown in FIG. 8 and FIG. 9, the included angles between respective positions of the continuous curved reflective surface 211 of each sub-reflector structure 210 and the substrate 220 are equal to realize the symmetry of the reflector structure.

For example, as shown in FIG. 8 and FIG. 9, the ring widths at respective positions of the ring shape formed by the orthographic projection of each sub-reflector structure 210 on the substrate 220 are equal, thus facilitating design and having a better reflection effect.

For example, as shown in FIG. 8, the orthographic projection of each sub-reflector structure 210 on the substrate 220 includes a semi-ring, and the orthographic projections of the plurality of sub-reflector structures 210 on the substrate 220 is arranged as a plurality of semi-rings. By setting the shape of each sub-reflector structure as a semi-ring structure and the shape of the plurality of sub-reflector structures as a multi-semi-ring structure, the processing techniques can be simplified.

For example, as shown in FIG. 8 and FIG. 9, along the direction perpendicular to the substrate 220 (the Z direction), the maximum sizes of respective sub-reflector structures 210 are equal, that is, the thicknesses of respective sub-reflector structures 210 are equal, so as to facilitate manufacture. In the case where the thicknesses of respective sub-reflector structures 210 are equal, the included angles between the reflective surfaces 211 of the sub-reflector structures 210 and the substrate 220 are gradually increased along the direction pointing from the inner ring of the multi-ring structure to the outer ring of the multi-ring structure, so the ring widths of the sub-reflector structures 210 are gradually decreased along the direction pointing from the inner ring to the outer ring.

For example, the plurality of sub-reflector structures can be arranged at equal intervals.

For example, as shown in FIG. 8 and FIG. 9, each sub-reflector structure 210 intersects with the substrate 220 and the intersection line is an arc line L. FIG. 8 and FIG. 9 illustratively show two arc lines L1 and L2 where two reflective surfaces 211 of two adjacent sub-reflector structures 210 intersect with the substrate 220.

Figure 10:
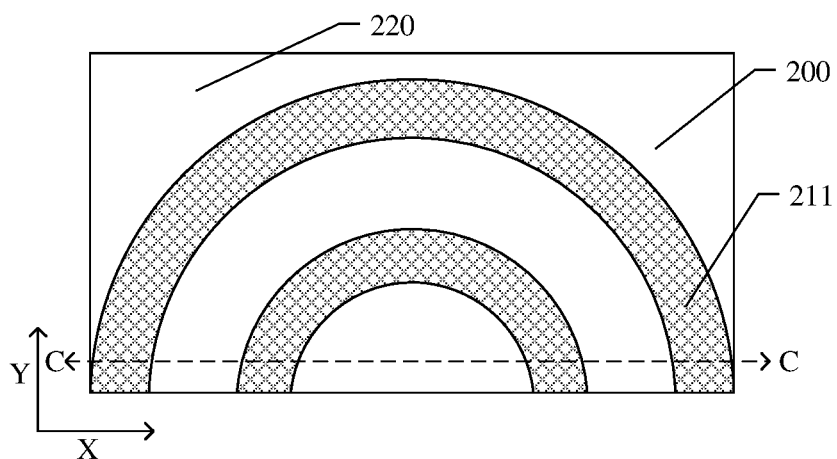
FIG. 10 is a partial planar structural view of another reflector structure in the display apparatus shown in FIG. 1 and FIG. 2.
Figure 11:
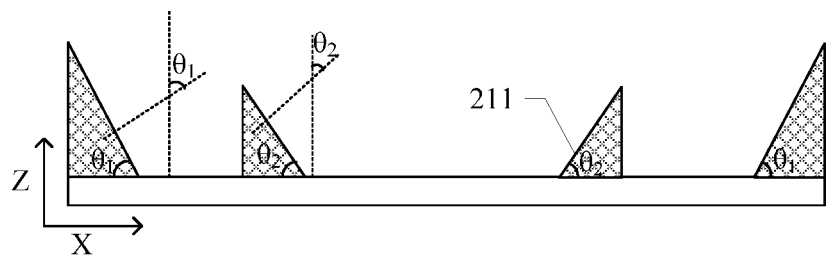
FIG. 11 is a partial cross-sectional structural view of the reflector structure shown in FIG. 10 taken along line CC.

FIG. 10 is a partial planar structural view of another reflector structure in the display apparatus shown in FIG. 1 and FIG. 2, and FIG. 11 is a partial cross-sectional structural view of the reflector structure shown in FIG. 10 taken along line CC. The reflector structure shown in FIG. 10 and FIG. 11 is different from the reflector structure shown in FIG. 8 and FIG. 9 in that: in the reflector structure 200 shown in FIG. 10 and FIG. 11, the maximum sizes of the sub-reflector structures 210 are equal along the direction pointing from the center of the multi-ring structure to the edge of the multi-ring structure. For example, the ring widths of the orthographic projections of the plurality of sub-reflector structures 210 on the substrate 220 are all equal. In the case where the included angles θ between the sub-reflector structures 210 and the substrate 220 are gradually increased along the direction from the inner ring of the multi-ring structure to the outer ring of the multi-ring structure, the ring widths of respective sub-reflector structures 210 are equal, so the heights of the sub-reflector structures 210 are gradually increased along the direction from the inner ring of the multi-ring structure to the outer ring of the multi-ring structure.

Figure 12:
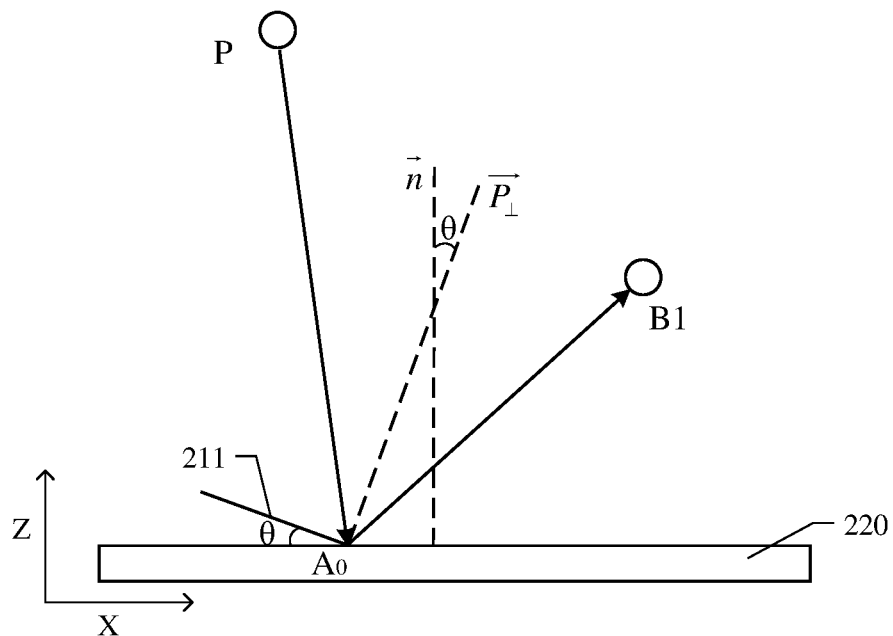
FIG. 12 is an optical path diagram of determining a normal line direction of each sub-reflector structure.
Figure 13:
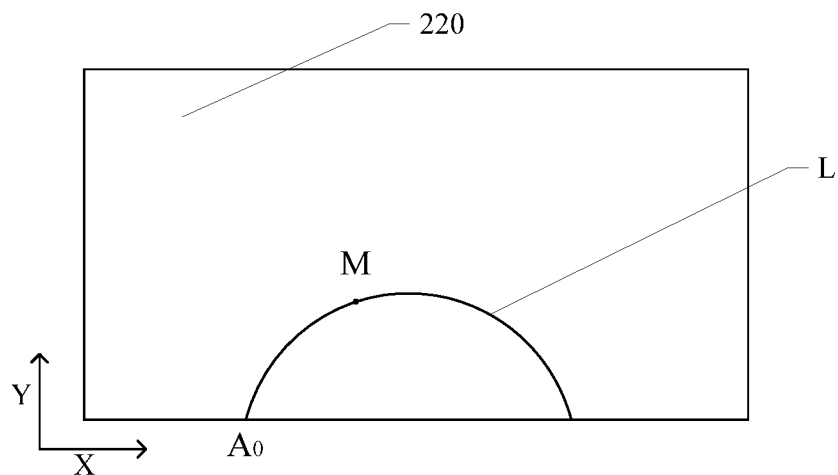
FIG. 13 is an arc intersection line of the curved reflective surface and the substrate as shown in FIG. 12.

For example, FIG. 12 is an optical path diagram of determining a normal line direction of each sub-reflector structure, and FIG. 13 is an arc intersection line of the curved reflective surface and the substrate as shown in FIG. 12. With reference to the method of determining the normal line direction of the sub-reflector structure as shown in FIG. 6, the point P shown in FIG. 12 is a point in the projector device, the point B1 in FIG. 12 is the virtual image position of the observation point in the first predetermined region, the point P and point B1 are both known points, and the point $A_0$ in FIG. 12 is a known point on the sub-reflector structure. As shown in FIG. 12 and FIG. 13, because the equation of a curved surface is often very complex, in order to find the curved reflective surface 211 of each sub-reflector structure 210 conveniently, the curved reflective surface can be determined by determining the included angle θ between the reflective surface 211 of the sub-reflector structure 210 and the substrate 220, and the intersection line L between the reflective surface 211 and the substrate 220. After determining the included angle and the intersection line between the curved reflective surface of the sub-reflector structure and the substrate, when the sub-reflector structure is formed by specific processing, the machining tool can fix the included angle and process along the trajectory of the intersection line, so that the required sub-reflector structure can be formed on the substrate, and the processing technique is simple.

For example, it is assumed that the coordinates of a known point $A_0$ on the intersection line L between the reflective surface of the sub-reflector structure 210 and the substrate 220 are $(x_0, y_0, z_0)$. There is no unique normal line to the curved reflective surface of each sub-reflector structure, but the normal line (i.e., vertical vector) of the reflective surface at the known point $A_0$ satisfies $\vec{P}_\perp = P_{\perp,x}, P_{\perp,y}, P_{\perp,z})$, and the above-mentioned $P_{\perp,x}$, $P_{\perp,y}$ and $P_{\perp,z}$ are the components of the normal vector $\vec{P}_\perp$ on the x axis, the y axis and the z axis. According to the reflection law, the incident angle between the incident light beam $PA_0$ and the normal line at the point $A_0$ on the reflective surface is equal to the emergent angle between the reflected light beam $A_0B_1$ and the normal line, then the normal vector $\vec{P}_\perp$ at the point $A_0$ on the reflective surface of the sub-reflector structure is located on the angular bisector of the vector $\overrightarrow{A_0P}$ and the vector $\overrightarrow{A_0B_1}$. Thus, the normal vector $\vec{P}_\perp$ satisfies the following relationship expression (4):

$$\vec{P}_\perp = \frac{\overrightarrow{A_0P}}{|A_0P|} + \frac{\overrightarrow{A_0B_1}}{|A_0B_1|}.$$

For example, assuming that the normal vector $\vec{n}$ of the substrate 220 satisfies $\vec{n} = (A, B, C)$, the above-mentioned A, B and C represent the components of the normal vector on the x axis, the y axis and the z axis, respectively. Because the location of the substrate 220 in the vehicle coordinate system is determined, the normal vector $\vec{n}$ of the substrate 220 is also known. According to the geometric relationship, the included angle between the normal vector of the substrate 220 and the normal line $\vec{P}_\perp$ at the point $A_0$ of the reflective surface is the included angle θ between the reflective surface 211 of the sub-reflector structure and the substrate 220. Therefore, the included angle θ between the normal vector $\vec{n}$ of the substrate 220 and the normal line $\vec{P}_\perp$ the point $A_0$ of the reflective surface of the sub-reflector structure satisfies the following relationship expression (5):

$$\vec{n} \cdot \vec{P}_\perp = |\vec{n}||\vec{P}_\perp|\cos\theta.$$

According to the vector scalar product relationship expression, the following relation (6) can be obtained:

$$\frac{|AP_{\perp,x} + BP_{\perp,y} + CP_{\perp,z}|}{\sqrt{P_{\perp,x}^2 + P_{\perp,y}^2 P_{\perp,z}^2}} = \cos\theta\sqrt{A^2+B^2+C^2}.$$

For example, according to the above relationship expressions (5)-(6), the included angle θ between the reflective surface 211 of the sub-reflector structure and the substrate 220 are obtained.

For example, as shown in FIG. 12 and FIG. 13, any point M(x, y, z) is taken on the intersection line L between the reflective surface 211 and the substrate 220, and the point M is located on the substrate 220, so that the point M, the point $A_0$ and the normal vector $\vec{n}$ of the substrate 220 satisfy the following relationship expression (7):

$$A(x-x_0)+B(y-y_0)+C(z-z_0)=0.$$

For example, the normal vector at the point M of the reflective surface 211 of the sub-reflector structure satisfies the following relationship expression (8):

$$\vec{n}_{P_\perp} = \frac{\overrightarrow{MP}}{|MP|} + \frac{\overrightarrow{MB_1}}{|MB_1|}.$$

The angle between the normal vector at the point M and the normal vector $\vec{n}$ of the substrate 220 is also θ. Therefore, the included angle θ between the normal vector $\vec{n}$ of the substrate 220 and the normal vector at the point M of the reflective surface of the sub-reflector structure satisfies the following relationship expression (9):

$$\vec{n} \cdot \vec{n}_{P_\perp} = |\vec{n}||n_{P_\perp}|\cos\theta.$$

For example, the coordinates x, y, z of the any point M(x, y, z) on the intersection line L between the reflective surface 211 of the sub-reflector structure and the substrate 220 have a certain value range, that is, the coordinates of M(x, y, z) cannot exceed the boundary range of the substrate 220, and the value range of M(x, y, z) can satisfy the following relationship expressions (10):

$$\begin{cases} x_v \leq x \leq x_u \\ y_v \leq y \leq y_u \\ z_v \leq z \leq z_u \end{cases}.$$

The above $x_v$, $x_u$, $y_v$, $y_u$, $z_v$ and $z_u$ are the boundary values of the size of the substrate 220, respectively.

In the embodiments of the present disclosure, the reflective surface of the sub-reflector structure can be a continuous curved surface, and the curved surface of the sub-reflector structure can be accurately determined by using the included angle θ between the reflective surface of the sub-reflector structure and the substrate, and the intersection line therebetween. Meanwhile, for other sub-reflector structures, another known point $A_0$ can be also determined, and then the corresponding included angle θ and intersection line can be determined. Different sub-reflector structures have different included angles θ, so the intersection lines between different sub-reflector structures and the substrate are also different.

Figure 14:
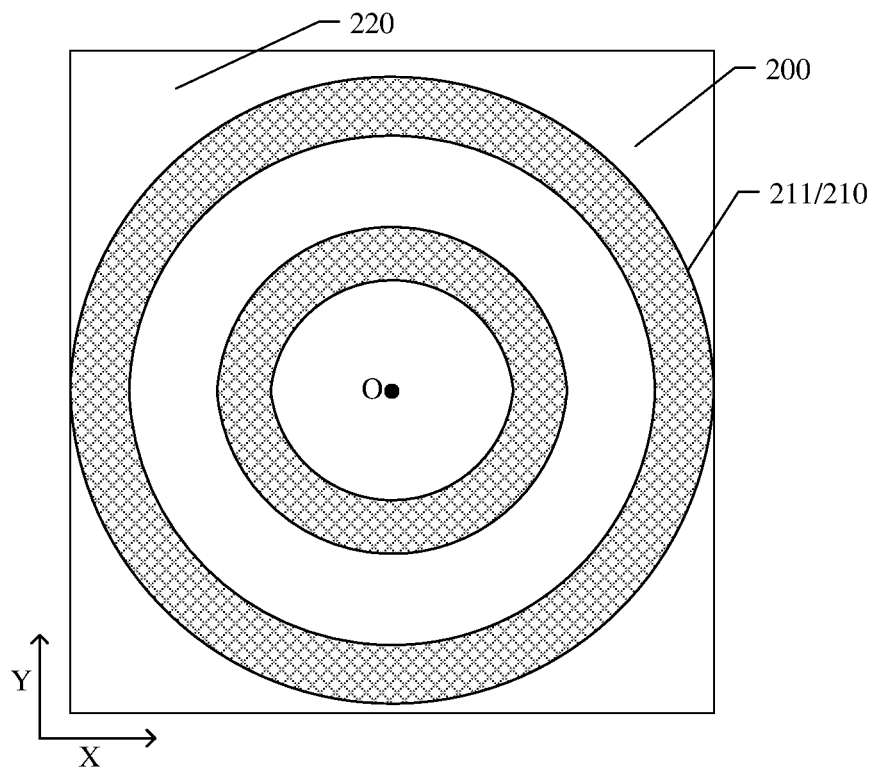
FIG. 14 is a partial planar structural view of another reflector structure in the display apparatus shown in FIG. 1 and FIG. 2.

For example, FIG. 14 is a partial planar structural view of another reflector structure in the display apparatus shown in FIG. 1 and FIG. 2. The reflector structure shown in FIG. 14 differs from the reflector structure shown in FIG. 8 only in that the reflective surface of each sub-reflector structure shown in FIG. 14 is a closed ring structure, and for example, it can be a round ring. In this case, the reference point of the reflector structure can be the center of the inner ring. Other features of the reflective surface shown in FIG. 14 are the same as those of the curved reflective surface shown in FIG. 8, and will not be described here.

Figure 15:
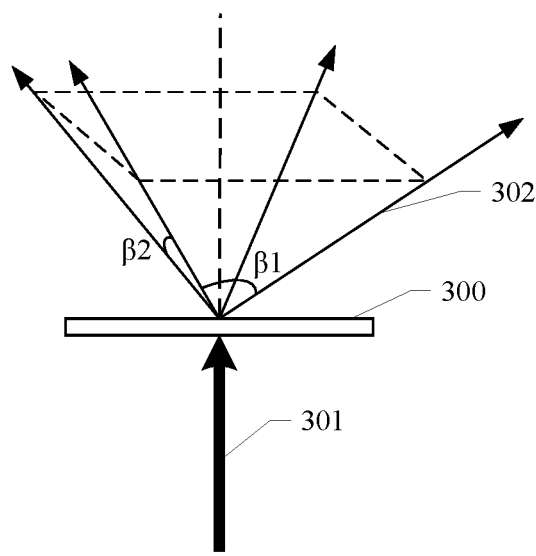
FIG. 15 is a schematic diagram of a diffusion optical path of a light beam diffuser structure in the display apparatus shown in FIG. 1.

FIG. 15 is a schematic diagram of a diffusion optical path of a light beam diffuser structure in the display apparatus shown in FIG. 1. As shown in FIG. 15, the light beam diffuser structure 300 diffuses the incident light beam 301, and can accurately control the diffusion degree of the incident light beam 301. The chief light of the diffused light beam 302 and the chief light of the incident light beam 301 are located on the same straight line, that is, the chief light of the light beam passing through the light beam diffuser structure 300 is unchanged, and the rays at the edge of the diffused light beam 302 are diffused at a certain angle along the chief light thereof. For example, the diffusion angle β1 of the diffused light beam 302 in the first direction can range from 5 degrees to 20 degrees, the diffusion angle β2 of the diffused light beam 302 in the second direction can range from 5 degrees to 10 degrees, and the diffusion angle refers to the included angle between the two maximum sight lines. For example, the light spot formed by the incident light beam 301 after passing through the light beam diffuser structure 300 can be a rectangle, and the first direction is the extending direction of the long side of the rectangle and the second direction is the extending direction of the short side of the rectangle, so the diffusion angle in the first direction refers to the included angle β1 between rays connected with both ends of the long side of the rectangular light spot, and the diffusion angle in the second direction refers to the included angle β2 between rays connected with both ends of the short side of the rectangular light spot. For example, in the case where the light spot formed by the light beam after passing through the light beam diffuser structure is a circular light spot, the diffusion angle is the included angle between the light at the edge of the light spot and the chief light, and the diffusion angles in all directions are the same.

For example, after passing through the light beam diffuser structure 300, the incident light beam 301 will diffuse into a light spot with a specific size and shape along the propagation direction, and uniform energy distribution. The size and shape of the light spot can be accurately controlled by a specific microstructure designed on the surface of the light beam diffuser structure 300. For example, the above specific shape is include, but is not limited to, linear, circular, elliptical, square, or rectangular.

For example, the light beam diffuser structure 300 can be indistinguishable in terms of the front and the back, and the light beam diffuser structure 300 has a similar diffusion effect on light incident from the projector device 100 onto the light beam diffuser structure 300 and light reflected by the reflector structure 200 and passing through the light beam diffuser structure 300. The propagation angle and spot size of the light beam after diffusion determine the brightness and visible region of the final imaging. The smaller the diffusion angle, the higher the imaging brightness, and the smaller the visible region; and vice versa.

For example, as shown in FIG. 1 and FIG. 2, in the case where the light beam diffuser structure 300 is removed from the optical path from the projector device 100 to the first predetermined region 410, the reflector structure 200 reflects the light emitted from the projector device 100 to the second predetermined region 420; the light intensity of light in the second predetermined region 420 is relatively strong, while the light intensity of light in the position of the first predetermined region 410 other than the second predetermined region 420 is relatively weak. In the embodiments of the present disclosure, by arranging the light beam diffuser structure 300, the light beam incident toward the second predetermined region 420 can be diffused at a preset diffusion angle deviating from the chief light direction thereof, and the diffused light beam is concentrated to the first predetermined region 410, so that the light in the second predetermined region 420 is diffused to the first predetermined region 410, and the uniform distribution of light intensity is realized.

For example, the light beam diffuser structure 300 can be a scattering optical element with low cost, such as a homogenizer, a diffuser, etc. When the light beam passes through the scattering optical element such as the homogenizer or the like, it will be scattered and a small amount of diffraction will occur, but scattering plays a major role, and a relatively large light spot will be formed after the light beam passes through the scattering optical element.

For example, the light beam diffuser structure 300 can also be a diffractive optical element (DOE) that can control the diffusion effect more accurately, such as a beam shaper, etc. For example, the diffractive optical element, by designing a specific microstructure on the surface thereof, the light beam by diffraction can be expanded, and the light spot is small, and the size and shape of the light spot can be controlled. For example, the preset cross-sectional shape of the diffused light beam incident toward the first predetermined region 410 after passing through the light beam diffusing structure 300 corresponds to the shape of the first predetermined region 410, so that the light efficiency can be improved.

For example, FIG. 15 illustratively shows that after the incident light beam 301 passes through a light beam diffuser structure 300 such as a diffractive optical element, the light beam diffuses to form an emergent light beam 302 with a preset cross-sectional shape, and FIG. 15 is illustrated by taking that the preset cross-sectional shape is a rectangle as an example. For example, the shape of the eyebox region is generally rectangular, so the rectangular light spot formed by the light beam diffuser structure corresponds to the rectangular eyebox region, thus improving the light efficiency; and in the case where the size of the rectangular light spot and the size of the eyebox region can be exactly the same and completely matched, the light efficiency can be further improved.

For example, in the case where the reflective surfaces of the sub-reflector structures are planar reflective surfaces as shown in FIG. 3, the heights of the sub-reflector structures can be the same or different along the direction perpendicular to the substrate, and the surface of the light beam diffuser structure facing the reflector structure can contact with one side of at least part of the sub-reflector structures away from the substrate. For example, in the case where the reflective surfaces of the sub-reflector structures are continuous curved surfaces as shown in FIG. 8 to FIG. 9, the surface of the light beam diffuser structure facing the reflector structure can contact with one side of at least part of the sub-reflector structures away from the substrate. For example, in the case where the reflective surfaces of the sub-reflector structures are continuous curved surfaces as shown in FIG. 10 to FIG. 11, the surface of the light beam diffuser structure facing the reflector structure can contact with one side, away from the substrate, of part of the sub-reflector structures with a relatively large height. Of course, the embodiments of the present disclosure are not limited thereto, and a frame can be arranged between the light beam diffuser structure and the reflector structure to carry the light beam diffuser structure. In this case, the light beam diffuser structure may not contact any sub-reflector structure, but the distance between the light beam diffuser structure and each sub-reflector structure is small.

In the embodiments of the present disclosure, the light beam diffuser structure arranged in the display apparatus has a diffusion effect on light beams, so that the brightness of light can be uniform, the imaging brightness of the display apparatus is uniform, and the use experience is improved.

Figure 16:
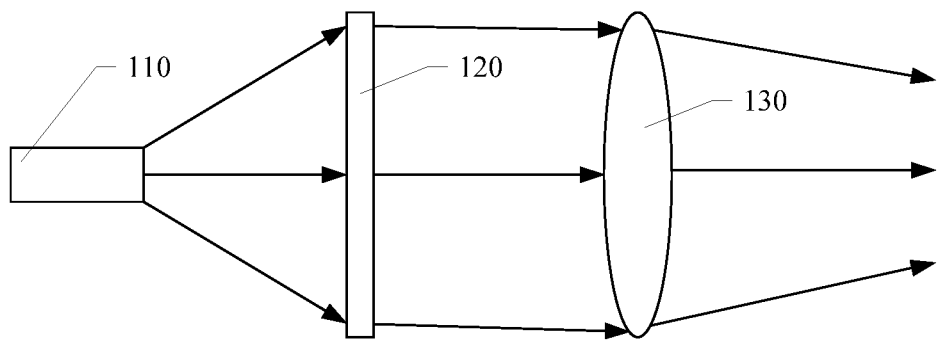
FIG. 16 is a partial internal structural view of a projector device according to an embodiment of the present disclosure.

For example, FIG. 16 is a partial internal structural view of a projector device according to an embodiment of the present disclosure. As shown in FIG. 16, the projector device includes a projection light source 110, an image generator portion 120, and a lens portion 130. The image generator portion 120 is configured to convert the light emitted from the projection light source 110 into image light, and the image light is emitted from the projector device after passing through the lens portion 130.

For example, the projector device can be a liquid crystal display (LCD) projector device or a digital light processing (DLP) device. For example, the projection light source 110 can be a gas discharge light source, including an ultra-high pressure mercury lamp, a short-arc xenon lamp and a metal halide lamp. For example, the projection light source 110 can also be an electroluminescent light source, such as a light emitting diode (LED). For example, the projection light source 110 can also be a laser light source.

For example, the image generator portion 120 can include a liquid crystal display (LCD) or a digital micromirror device (DMD).

For example, the image light emitted from the image generator portion 120 passes through the lens portion 130 to form projection light beams. For example, the lens portion 130 can include a convex lens, or an equivalent lens group that plays a similar role to the convex lens, such as a combination of a convex lens, a concave lens and a Fresnel lens. For example, a large-sized picture can be formed by the projection light beams emitted from the lens portion 130.

Figure 17:
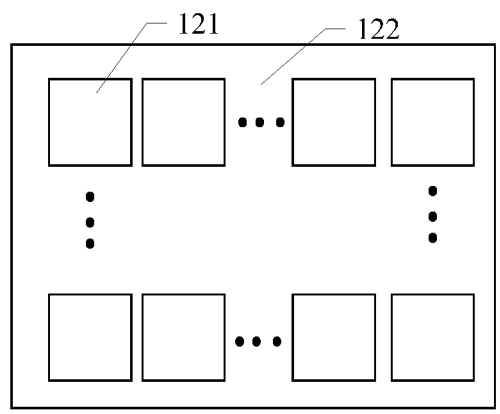
FIG. 17 is a partial planar structural view of pixels included in an image generator portion as shown in FIG. 16.

For example, FIG. 17 is a partial planar structural view of pixels included in the image generator portion as shown in FIG. 16. As shown in FIG. 17, the image generator portion 120 includes a base substrate 122 and a plurality of pixels 121 located on the base substrate 122, and for example, the plurality of pixels 121 are arranged in an array. For example, as shown in FIG. 3, FIG. 4 and FIG. 17, the maximum size of the reflective surface 211 of each sub-reflector structure 210 is not larger than the maximum size of each pixel 121. For example, the maximum size of the orthographic projection of the reflective surface 211 of each sub-reflector structure 210 on the substrate 220 is not larger than the maximum size of each pixel 121.

Figure 18:
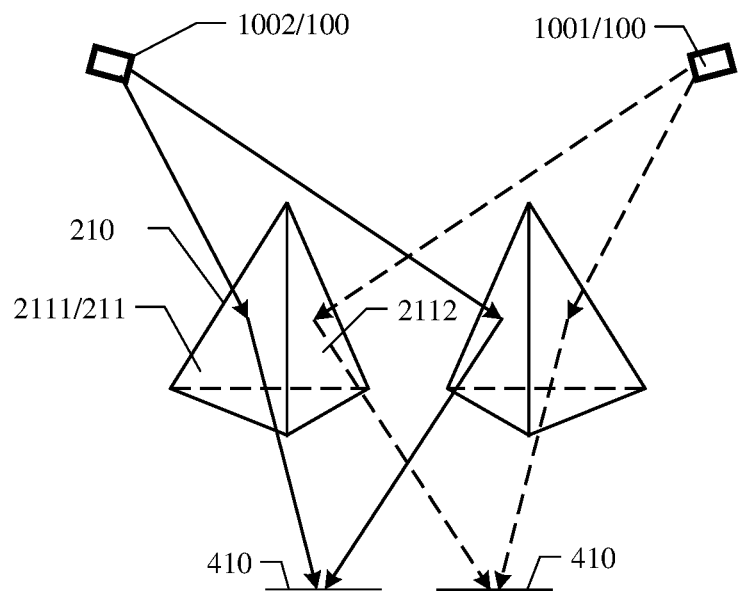
FIG. 18 is a partial structural view of a display apparatus according to another example of the embodiment of the present disclosure.

For example, FIG. 18 is a partial structural view of a display apparatus according to another example of the embodiment of the present disclosure. As shown in FIG. 18, each sub-reflector structure 210 includes at least two reflective surfaces 211, the projector device 100 includes two sub-projector devices 1001 and 1002, each sub-reflector structure 210 is configured to reflect light emitted from the two sub-projector devices 1001 and 1002 to a third predetermined region 440, and the third predetermined region 440 includes two first predetermined regions 410. FIG. 18 merely illustratively shows the projector device 100 and two sub-reflector structures 210 in the reflector structure. For example, the plurality of sub-reflector structures included in the reflector structure in the present example have the same arrangement manner as the sub-reflector structures shown in FIG. 3, the only difference lies in that each sub-reflector structure in the present example includes at least two planar reflective surfaces. FIG. 18 does not show the light beam diffuser structure, and the light beam diffuser structure in the present example can be the same as the light beam diffuser structure shown in FIG. 15, and details will not be repeated here. For example, in the case where the light beam diffuser structure 300 is removed from the optical path from the projector device 100 to the at least two first predetermined regions 410 described above, the plurality of sub-reflector structures 210 are configured to reflect light emitted from the projector device 100 to a second predetermined region (not shown, referring to FIG. 1) within each first predetermined region 410, and the area of the second predetermined region 420 is smaller than the area of the first predetermined region 410. FIG. 18 illustratively shows that the light exiting from the reflector structure directly concentrates to the first predetermined region 410 for imaging, which it is not limited thereto. For example, the transflective structure 500 shown in FIG. 5 or other optical elements also be inserted between the light beam diffuser structure and the first predetermined region 410, without being limited in the embodiments of the present disclosure.

For example, each sub-reflector structure 210 is provided with two reflective surfaces 2111 and 2112, so as to reflect the light emitted from the two sub-projector devices 1001 and 1002 to different positions, i.e., two different first predetermined regions 410. For example, the two different first predetermined regions 410 are the left eye and the right eye of an observer, so that the observer can observe a 3D image. For example, the two different first predetermined regions 410 can also be different eyebox regions, e.g., the driver's eyebox region and the passenger's eyebox region, so that the driver and the passenger can see different images respectively.

Another embodiment of the present disclosure provides a motor vehicle, which includes the display apparatus described in any of the above embodiments. The motor vehicle provided by the embodiment of the present disclosure adopts the display apparatus as mentioned above, so that the driver can directly see more abundant information, such as navigation map, complex safety information and other large-sized pictures, without looking down at the dashboard during driving, and therefore, the requirements of the driver for master various kinds of information during driving can be better met.

For example, the transflective structure in the display apparatus can be the windshield or a displaying window of the motor vehicle.

The following statements should be noted:
(1) The accompanying drawings related to the embodiment(s) of the present disclosure involve only the structure(s) in connection with the embodiment(s) of the present disclosure, and other structure(s) can be referred to common design(s).
(2) In case of no conflict, features in one embodiment or in different embodiments can be combined.

What have been described above are only specific implementations of the present disclosure, and the protection scope of the present disclosure is not limited thereto. Therefore, the protection scope of the present disclosure should be determined based on the protection scope of the claims.

What is claimed is:

1. A display apparatus, comprising a projector device, a reflector structure and a light beam diffuser structure,
wherein light emitted from the projector device passes through the light beam diffuser structure, is reflected by the reflector structure, and then reaches a first predetermined region;
the light beam diffuser structure is configured to diffuse a light beam passing through the light beam diffuser structure without changing chief light of the light beam;
the reflector structure comprises a plurality of sub-reflector structures, the plurality of sub-reflector structures are configured to reflect the light emitted from the projector device and the light reflected by the plurality of sub-reflector structures reaches a second predetermined region within the first predetermined region if the light beam diffuser structure is removed from an optical path from the projector device to the first predetermined region, and an area of the second predetermined region is smaller than an area of the first predetermined region;
the reflector structure further comprises a substrate, the plurality of sub-reflector structures are arranged at intervals on a side of the substrate, the side of the substrate faces the projector device, each of the plurality of sub-reflector structures comprises at least one reflective surface, and a plurality of reflective surfaces that the plurality of sub-reflector structures comprise are configured to reflect and converge the light emitted from the projector device;
each of the plurality of sub-reflector structures comprises one planar reflective surface, the reflector structure comprises a reference region, and angles between planar reflective surfaces of the plurality of sub-reflector structures and the substrate are gradually increased along a direction away from the reference region.

2. The display apparatus of claim 1, further comprising:
a transflective structure, configured to reflect the light being reflected by the reflector structure and exiting from the light beam diffuser structure, wherein the light reflected by the transflective structure reaches the first predetermined region.

3. The display apparatus of claim 2, wherein the light beam diffuser structure and the reflector structure are stacked, the light emitted from the projector device is incident on the reflector structure after passing through the light beam diffuser structure, and the light reflected by the reflector structure passes through the light beam diffuser structure again and then reaches the first predetermined region.

4. The display apparatus of claim 2, wherein the transflective structure is configured to reflect light, which is directly incident on the transflective structure after passing through the light beam diffuser structure and being reflected by the reflector structure, directly to the first predetermined region.

5. The display apparatus of claim 2, wherein the projector device, the first predetermined region, the reflector structure and the light beam diffuser structure are located at a first side of the transflective structure, and the transflective structure is further configured to transmit ambient light from a second side of the transflective structure to the first predetermined region.

6. The display apparatus of claim 1, wherein a maximum size of the planar reflective surface of each of the plurality of sub-reflector structures is larger than a distance between two adjacent sub-reflector structures.

7. The display apparatus of claim 6, wherein the maximum size of each planar reflective surface ranges from 100 microns to 100 millimeters.

8. The display apparatus of claim 1, wherein a shape of each of the plurality of sub-reflector structures comprises a polyhedron, and one surface of the polyhedron is the planar reflective surface.

9. The display apparatus of claim 1, wherein the planar reflective surface of each of the plurality of sub-reflector structures comprises a preset point, a mirror point formed by an observation point in the first predetermined region relative to the transflective structure is a virtual image of the observation point, a mirror point formed by the preset point relative to the transflective structure is a virtual image of the preset point, and a center of a light emitting surface of the projector device is a light emitting point,
a normal line of the planar reflective surface is located at an angular bisector of a first connecting line, between the preset point and the light emitting point, and a second connecting line, between the preset point and the virtual image of the observation point; or
a connecting line between the observation point and the virtual image of the preset point intersects the transflective structure to have an intersection point with the transflective structure, and a normal line of the planar reflective surface is located at an angular bisector of a first connecting line, between the preset point and the light emitting point, and a third connecting line, between the preset point and the intersection point.

10. The display apparatus of claim 1, wherein the projector device comprises a projection light source, an image generator portion and a lens portion, the image generator portion is configured to convert light emitted from the projection light source into image light, and the image light is emitted from the projector device after passing through the lens portion;
the image generator portion comprises a plurality of pixels, and a maximum size of the reflective surface of each of the plurality of sub-reflector structures is not larger than a maximum size of each of the plurality of pixels.

11. A head-up display, comprising the display apparatus of claim 1.

12. A motor vehicle, comprising the head-up display of claim 11.

13. A display apparatus, comprising a projector device, a reflector structure and a light beam diffuser structure,
wherein light emitted from the projector device passes through the light beam diffuser structure, is reflected by the reflector structure, and then reaches a first predetermined region;
the light beam diffuser structure is configured to diffuse a light beam passing through the light beam diffuser structure without changing chief light of the light beam;
the reflector structure comprises a plurality of sub-reflector structures, the plurality of sub-reflector structures are configured to reflect the light emitted from the projector device and the light reflected by the plurality of sub-reflector structures reaches a second predetermined region within the first predetermined region if the light beam diffuser structure is removed from an optical path from the projector device to the first predetermined region, and an area of the second predetermined region is smaller than an area of the first predetermined region;

the reflector structure further comprises a substrate, the plurality of sub-reflector structures are arranged at intervals on a side of the substrate, the side of the substrate faces the projector device, each of the plurality of sub-reflector structures comprises at least one reflective surface, and a plurality of reflective surfaces that the plurality of sub-reflector structures comprise are configured to reflect and converge the light emitted from the projector device;

each of the plurality of sub-reflector structures comprises a continuous curved reflective surface, and reflective surfaces of adjacent sub-reflector structures are not parallel to each other.

14. The display apparatus of claim 13, wherein a cross section of each of the plurality of sub-reflector structures taken along an arrangement direction of the plurality of sub-reflector structures comprises a polygon; and in the cross section of the each of the plurality of sub-reflector structures, a side where the reflective surface is located is a straight side.

15. The display apparatus of claim 13, wherein each of the plurality of sub-reflector structures is a ring structure, the plurality of sub-reflector structures are arranged as a multi-ring structure, and a surface of each ring structure, the surface facing a center of the reflector structure, is the curved reflective surface.

16. The display apparatus of claim 15, wherein angles between a plurality of curved reflective surfaces of the plurality of sub-reflector structures and the substrate are gradually increased along a direction pointing from an inner ring of the multi-ring structure to an outer ring of the multi-ring structure.

17. The display apparatus of claim 13, wherein maximum sizes of respective sub-reflector structures are equal along a direction perpendicular to the substrate; or, ring widths of orthographic projections of the plurality of sub-reflector structures on the substrate are equal.

18. The display apparatus of claim 13, further comprising:
a transflective structure, configured to reflect the light being reflected by the reflector structure and exiting from the light beam diffuser structure, wherein the light reflected by the transflective structure reaches the first predetermined region.

19. The display apparatus of claim 18, wherein the light beam diffuser structure and the reflector structure are stacked, the light emitted from the projector device is incident on the reflector structure after passing through the light beam diffuser structure, and the light reflected by the reflector structure passes through the light beam diffuser structure again and then reaches the first predetermined region;

the projector device, the first predetermined region, the reflector structure and the light beam diffuser structure are located at a first side of the transflective structure, and the transflective structure is further configured to transmit ambient light from a second side of the transflective structure to the first predetermined region.

20. A head-up display, comprising the display apparatus of claim 13.

21. A display apparatus, comprising a projector device, a reflector structure and a light beam diffuser structure, wherein light emitted from the projector device passes through the light beam diffuser structure, is reflected by the reflector structure, and then reaches a first predetermined region;

the light beam diffuser structure is configured to diffuse a light beam passing through the light beam diffuser structure without changing chief light of the light beam;

the reflector structure comprises a plurality of sub-reflector structures, the plurality of sub-reflector structures are configured to reflect the light emitted from the projector device and the light reflected by the plurality of sub-reflector structures reaches a second predetermined region within the first predetermined region if the light beam diffuser structure is removed from an optical path from the projector device to the first predetermined region, and an area of the second predetermined region is smaller than an area of the first predetermined region;

the reflector structure further comprises a substrate, the plurality of sub-reflector structures are arranged at intervals on a side of the substrate, the side of the substrate faces the projector device, each of the plurality of sub-reflector structures comprises at least one reflective surface, and a plurality of reflective surfaces that the plurality of sub-reflector structures comprise are configured to reflect and converge the light emitted from the projector device;

each of the plurality of sub-reflector structures comprises at least two reflective surfaces, the projector device comprises two sub-projector devices, each of the plurality of sub-reflector structures is configured to reflect light emitted from the two sub-projector devices, the light emitted from the two sub-projector devices and reflected by each of the plurality of sub-reflector structures reaches a third predetermined region, and the third predetermined region comprises two first predetermined regions.

22. The display apparatus of claim 21, further comprising:
a transflective structure, configured to reflect the light being reflected by the reflector structure and exiting from the light beam diffuser structure, wherein the light reflected by the transflective structure reaches the first predetermined region.

23. The display apparatus of claim 22, wherein the light beam diffuser structure and the reflector structure are stacked, the light emitted from the projector device is incident on the reflector structure after passing through the light beam diffuser structure, and the light reflected by the reflector structure passes through the light beam diffuser structure again and then reaches the first predetermined region;

the projector device, the first predetermined region, the reflector structure and the light beam diffuser structure are located at a first side of the transflective structure, and the transflective structure is further configured to transmit ambient light from a second side of the transflective structure to the first predetermined region.

24. A head-up display, comprising the display apparatus of claim 21.

* * * * *